United States Patent
Chen (10) Patent No.: US 11,275,564 B2
(45) Date of Patent: *Mar. 15, 2022

(54) DECENTRALIZED RANDOM NUMBER GENERATOR

(71) Applicant: MOAC BLOCKCHAIN TECH INC, Palo Alto, CA (US)

(72) Inventor: Xiaohu Chen, Mountain View, CA (US)

(73) Assignee: MOAC BLOCKCHAIN TECH INC., Palo Alto, CA (US)

(*) Notice: Subject to any disclaimer, the term of this patent is extended or adjusted under 35 U.S.C. 154(b) by 11 days.

This patent is subject to a terminal disclaimer.

(21) Appl. No.: 17/013,299

(22) Filed: Sep. 4, 2020

(65) Prior Publication Data

US 2020/0401377 A1    Dec. 24, 2020

Related U.S. Application Data (63) Continuation of application No. 16/242,780, filed on Jan. 8, 2019, now Pat. No. 10,795,644.

(51) Int. Cl.
| | |
|---|---|
| *G06F 7/58* | (2006.01) |
| *H04L 9/08* | (2006.01) |
| *H04L 29/06* | (2006.01) |
| *H04L 29/08* | (2006.01) |
| *H04L 12/18* | (2006.01) |

(Continued)

(52) U.S. Cl.
CPC .............. *G06F 7/582* (2013.01); *G06F 9/466* (2013.01); *G06F 9/4881* (2013.01); *H04L 9/0637* (2013.01); *H04L 9/0869* (2013.01); *H04L 12/1881* (2013.01); *H04L 67/108* (2013.01); *H04L 67/1048* (2013.01); *H04L 67/1093* (2013.01); *H04L 67/26* (2013.01); *H04L 67/38* (2013.01); *H04L 2209/38* (2013.01)

(58) Field of Classification Search
CPC .................................................. G06F 7/58–588
USPC .................................................. 708/250–256
See application file for complete search history.

(56) References Cited

U.S. PATENT DOCUMENTS

| | | | |
|---|---|---|---|
| 6,957,331 | B2 | 10/2005 | Kursawe et al. |
| 2018/0076957 | A1 | 3/2018 | Watanabe et al. |

(Continued)

OTHER PUBLICATIONS

Hanke, et al., "DFINITY Technology Overview Series, Consensus System, Rev. 1," 2018, [online] available: http://arxiv.org/abs/1805.04548v1 (Year: 20018).

(Continued)

*Primary Examiner* — Matthew D Sandifer (57) ABSTRACT

The current disclosure is directed towards efficiently generating random sequences on a large-scale peer-to-peer network. In one example, the disclosure provides for selecting a first node based on a block generation order, where the first node is selected to generate a current block, adding a first signature share of the first node to the current block, adding at least a second signature share from a previously selected node to the current block, generating a random sequence based on the first signature share and the second signature share, adding the random sequence to the current block, and publishing the current block to a blockchain maintained by a node pool. In this way, a random sequence may be generated on-chain, with linear messaging complexity, without relying on a single trusted party/apparatus, which may thereby decrease a probability of any single party controlling the random sequence produced.

20 Claims, 5 Drawing Sheets

(51) Int. Cl.
*H04L 9/06* (2006.01)
*G06F 9/46* (2006.01)
*G06F 9/48* (2006.01)
*H04L 67/131* (2022.01)
*H04L 67/1074* (2022.01)
*H04L 67/1087* (2022.01)
*H04L 67/1042* (2022.01)
*H04L 67/55* (2022.01)

(56) References Cited

U.S. PATENT DOCUMENTS

2019/0280880 A1 9/2019 Zhang et al.
2020/0145231 A1 5/2020 Trevethan

OTHER PUBLICATIONS

UltraYOLO, "Proof-of-Randomness: UltraYOLO's Random Number Generation (RNG) on the Blockchain," Feb. 2018, available at http://medium.com/ultrayolo/ultrayolos-random-number-generation-rng-on-th-blockchain-proof-of-randomness (Year: 2018).

DECENTRALIZED RANDOM NUMBER GENERATOR

RELATED PRIOR APPLICATIONS

This application is a Continuation Application of U.S. application Ser. No. 16/242,780, entitled "Decentralized Random Sequence Generator", filed on Jan. 8, 2019, the contents of which are incorporated by reference in its entirety.

TECHNICAL FIELD

The present description relates generally to generating random sequences on large-scale networks, and more particularly, to apparatuses and methods for decentralized generation of random sequences within a large-scale peer-to-peer network.

BACKGROUND

Generating random sequences (or pseudo-random sequences) is one of the harder things to do on a blockchain, as the underlying system is both open and deterministic. The determinism of a blockchain has many benefits, but prohibits the entropy required to make a pseudo-random sequence as random as possible. In other words, it is very difficult to roll a dice without knowing the outcome beforehand using current blockchain technology.

One approach directed towards addressing this issue teaches using an off-chain service (a non-blockchain service) for random sequence generation. Services, such as Oracalize, can be used to access off-chain services, which may provide random sequence generating functionality. Random sequences generated using an off-chain service may then be brought "on-chain" by importing the random sequence onto the blockchain. However, one shortcoming of the above approach, recognized by the inventors herein, is that while oracles are very useful in getting external data on-chain, they introduce trusted third parties, which in certain cases defeats the purpose of using a blockchain, as a central feature of a blockchain is its trustless nature. For example, the critical decision-making of games may be implemented on the blockchain for transparency reasons, however, if the critical decision-making is based on random sequences provided by an off-chain third party, this is functionally equivalent to running the game using a traditional server backend, as there may be no way to validate that the random sequence provided is truly random, and that no player received advance access to the random sequence, thereby giving that player an unfair advantage.

Another approach, directed towards generating random sequences on-chain, teaches using the changing values of a blockchain related variable as a source of entropy for random sequence generation. In one example, a blockchain related variable used as a source of entropy for random sequence generation may be the timestamp of the current block, the hash of the previous block or some other variable, such as block difficulty. The most commonly used value is the hash of the previous block. However, one issue identified by the inventors herein with using hashes and similar variables as a source of entropy, is that the miner can manipulate them, thereby controlling/influencing the random sequence produced. Another issue with the above approach, identified by the inventors herein, is that an attacker can make an exploit contract with the same pseudo-random-number-generator (PRNG) code in order to obtain the random sequence, thereby comprising the outcome of any decision the random sequence is used to determine.

In another approach directed towards generating random sequences on-chain, without relying on a single party to generate the random sequence, a commit-reveal strategy is used. The commit-reveal strategy comprises two phases: a "commit" stage, where two or more parties submit cryptographically protected secrets (e.g., an encrypted alpha-numeric string) to the blockchain, and a "reveal" stage, where the parties each announce/reveal/decrypt their secrets, and the decrypted secrets are subsequently combined and used to seed a random sequence generator function, thereby producing a random sequence which no one party solely determines/seeds. The commit-reveal strategy may partially mitigate the miner/owner incentive problem discussed above, however, the inventors herein have identified several issues with this approach. In one example, a single party refusing to reveal a secret will result in denial of service. In another example, the commit-reveal strategy involves multiple steps, and multiple rounds of communication/messaging between parties, which may make the implementation difficult and with a high degree of messaging complexity (a measure of how the amount of time and computational resources needed to implement the method scale with the number of parties).

It is therefore desirable to provide for the generation of random sequences on-chain, to provide transparency regarding the process of random sequence generation as well as an immutable ledger recording the random sequence. It is further desirable to provide these on-chain random sequences in such a way as to prevent a single party from solely determining the seeding/generation of the random sequence. It is further desirable to generate random sequences on-chain with a low degree of messaging complexity, in order to reduce the time and computational resources required to generate these on-chain random sequences. The concepts disclosed below address these needs and others.

SUMMARY

The current disclosure provides methods and apparatuses for generating on-chain random sequences, in a decentralized and computationally efficient manner using threshold signatures. Each node within a subgroup of a large-scale, peer-to-peer network (herein also referred to as a node pool) may be selected one at a time, according to a pre-determined block generation order, to generate a block and publish the block to a blockchain maintained by the node pool. Upon selection, a selected node of the node pool may determine if m−1 signature shares on certain pre-defined messages have been received from previously selected nodes, where m is a positive integer greater than 1. If a selected node determines that m−1 signature shares (herein also referred to as sig. shares) have been received from previously selected nodes of the node pool, the selected node may proceed to generate a threshold signature based on the m−1 received sig. shares and its own sig. share. In other words, a selected node with access to m sig. shares may be enabled to generate a threshold signature, wherein the threshold signature could not be derived from less than m sig. shares, and therefore could not be known prior to generation by the selected node. In one example, the threshold signature may be used as the random sequence, and the random sequence, along with the m sig. shares used to determine the threshold signature may be included within a block generated by the selected node of the node pool, and published to the blockchain. By including the threshold signature and the m sig. shares used to determine the threshold signature, the other nodes of the node pool may determine if the threshold signature is valid based on the m sig. shares. In another example, the threshold signature determined based on the m sig. shares may be used as a seed for a random sequence generator, and in this manner a random sequence may be generated based on the determined threshold signature. The selected node may further broadcast its sig. share on pre-defined messages to the node pool, for use in determining the next m−1 random sequences for the next m−1 generated blocks. In this way, no one party/node may control the determination of the random sequence, as the random sequence is based on two or more signature shares corresponding to two or more nodes, wherein a threshold signature determined based on m sig. shares could not have been determined with less than m sig. shares. Further, this approach may enable on-chain random sequence generation with linear message complexity, wherein the message complexity increases linearly with m, which is a substantial improvement over conventional approaches, which increase in message complexity exponentially as m increases.

In one example, the current disclosure provides for a method comprising: selecting a first node based on a block generation order, where the first node is selected to generate a current block; adding a first signature share of the first node to the current block; adding at least a second signature share from a previously selected node to the current block; generating a random sequence based on the first signature share and the second signature share; adding the random sequence to the current block; and publishing the current block to a blockchain maintained by a node pool.

In a second example, the current disclosure provides for a method of generating a random sequence in a node pool, the method comprising: selecting a first node of the node pool based on a block generation order; receiving a plurality of signature shares at the first node; responsive to the plurality of signature shares exceeding a threshold number of signature shares: determining a threshold signature; generating a random sequence based on the threshold signature; and broadcasting a block to the node pool, wherein the block comprises: the plurality of signature shares; the threshold signature; and the random sequence.

In a third example, the current disclosure provides for a node within a node pool comprising: a network interface; a memory; and a processor communicatively coupled to the network interface and the memory, the processor configured to: receive a plurality of signature shares from the node pool via the network interface; responsive to the plurality of signature shares exceeding a threshold number of signature shares: determine a threshold signature; generate a random sequence based on the threshold signature; and broadcast a block to the node pool via the network interface, wherein the block comprises: the plurality of signature shares; the threshold signature; and the random sequence.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

Figure 1:
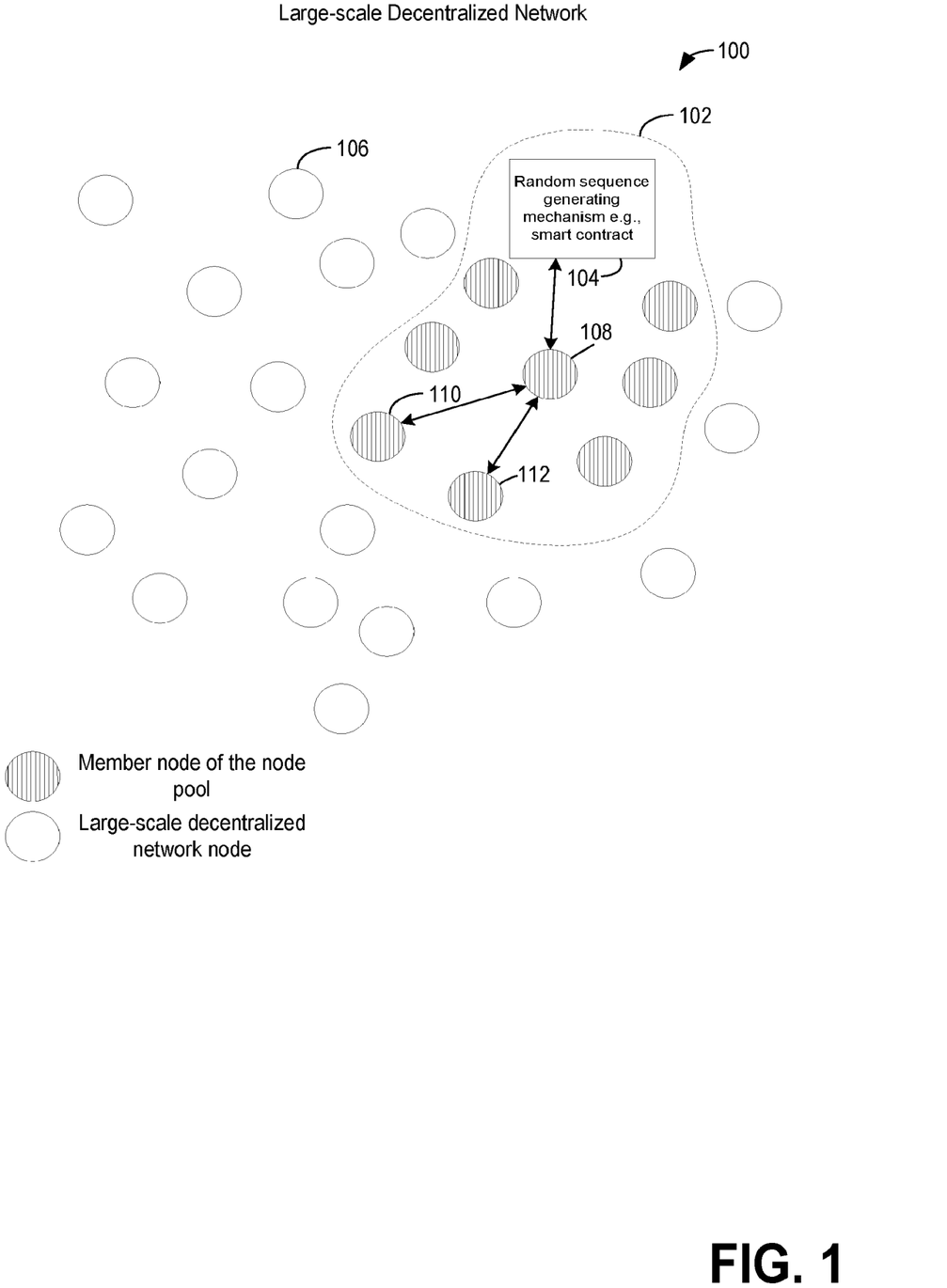
FIG. 1 is an illustration of a large-scale decentralized network, including a group of nodes forming a node pool.
Figure 4:
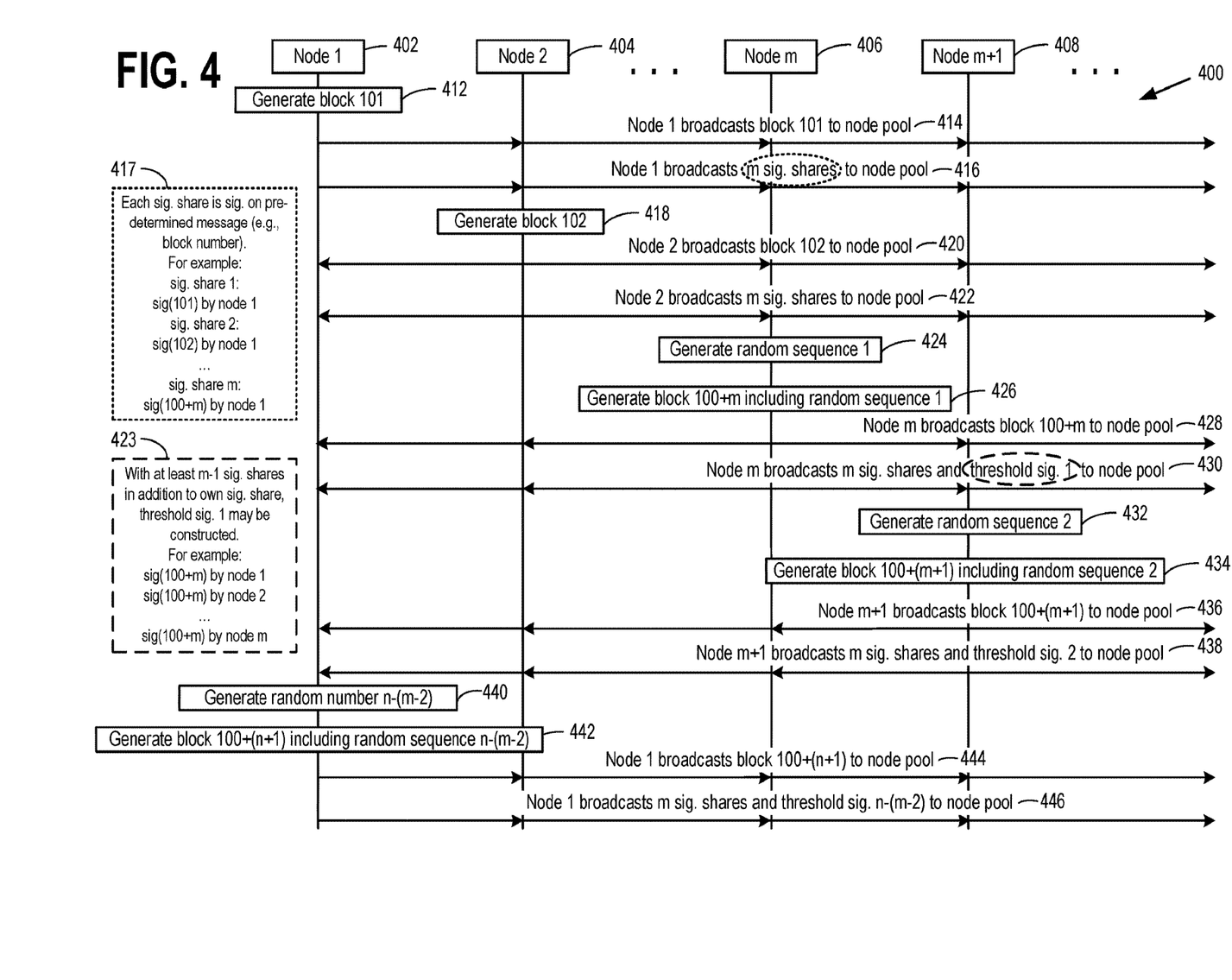
FIG. 4 shows a flow diagram of a process for generating random sequences on a blockchain.
Figure 5:
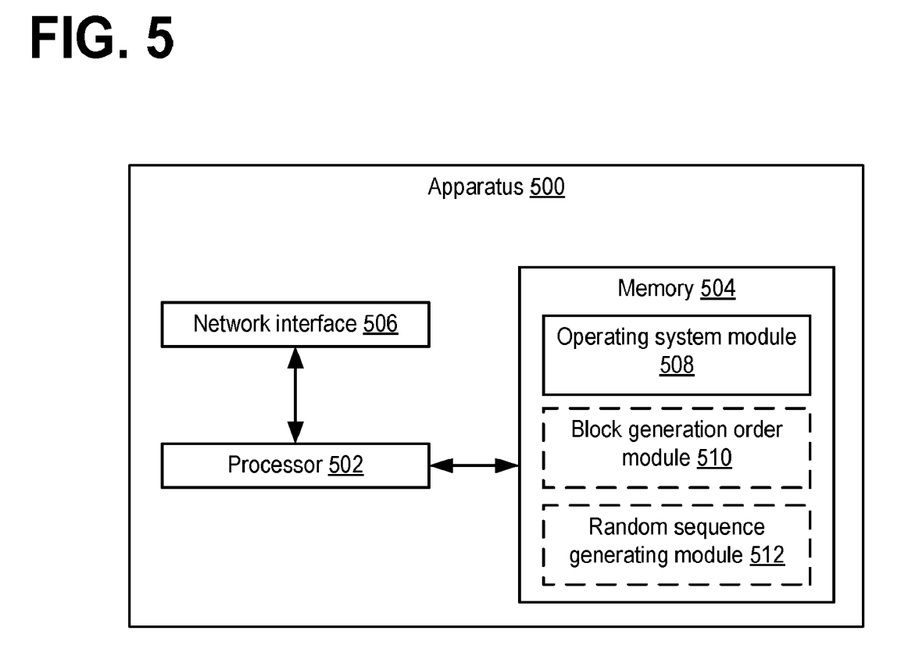
FIG. 5 shows a block diagram illustrating an apparatus, which in one embodiment may comprise a node of a node pool.

The current disclosure provides methods and apparatuses for generating on-chain random sequences, in a decentralized and computationally efficient manner using threshold signatures. FIG. 1 illustrates node pool 102, which comprises a random sequence generating mechanism 104. In one example, random sequence generating mechanism 104 comprises a smart contract, which may contain instructions that when executed by one or more nodes carries out one or more steps of the methods herein disclosed. In one example, smart contract 104 may comprise instructions for initializing, maintaining, and updating a blockchain according to a method, one example of which is illustrated by method 200 shown in FIG. 2. Method 200 may provide for generating random sequences on-chain, and including these random sequences in the blockchain maintained by the nodes of the node pool. Random sequences generated on-chain may be further used to determine an outcome of one or more smart contracts, game decisions, transaction amounts, transaction recipients, etc., which may likewise be recorded on the blockchain maintained by the node pool. One example of a method for generating on-chain random sequences, in a decentralized, transparent, and computationally efficient manner, is shown by method 300 of FIG. 3. A prophetic example of the execution of method 300 is shown in FIG. 4, which emphasizes the communication/data transfer between nodes of a node pool as part of a method to generate random sequences and publish the random sequences to a blockchain. FIG. 5 shows apparatus 500, which comprises a node configured to enable implementation of a random sequence generating blockchain. Apparatus 500 may execute instructions stored in memory to perform one or more steps of the methods herein disclosed.

As used herein, the term "on-chain" will be recognized to mean an action, process, transaction, computation, or other occurrence, which is generated and/or immutably recorded on a distributed ledger (herein also referred to as a blockchain). Data generated "on-chain" may refer to data derived from one or more pieces of data previously stored on a blockchain/distributed ledger, such that data derived in this manner may be validated by other nodes of the blockchain. As a specific example, a random sequence generated on-chain may refer to a random sequence produced by one or more nodes maintaining a blockchain which is immutably recorded on the blockchain and which may further be validated by one or more additional nodes, such that the nodes maintaining the blockchain reach a consensus of validity for the generated random sequence. Validity, as used in the previous example, may refer to a determination that a random sequence was generated according to a pre-determined method, thereby indicating that the process of random sequence generation was not altered by one or more malicious actors.

It will be appreciated that a known mathematical property of signature shares, is that a threshold signature may be used to derive n signature shares, wherein n is a positive integer greater than 1, and that any m or more signature shares may be used to obtain the original threshold signature (where m is a positive integer greater than 1 and less than or equal to n), while any m−1 or less sig. shares is unable to derive any information regarding the threshold signature. Thus, in one example, a group of n members, wherein each member possesses a single unique sig. share (where the threshold sig. has been used to generate n sig. shares), and wherein no member knows the threshold sig., may derive/determine the threshold sig. by cooperating with m−1 other members. In other words, a first member of a group of n members may produce a threshold sig. (which may comprise a number) by acquiring m−1 sig. shares from m−1 other group members, which when combined with the first member's sig. share produces m sig. shares, which may be used to derive the threshold sig., wherein no member of the group is aware of the identity of the threshold sig. until after m sig. shares are combined and polynomial interpolation is used. Once a threshold sig. is determined, the other group members may validate that the threshold sig. determined by the first member is valid, by performing their own derivation of the threshold sig. based on the m or more sig. shares.

Turning to FIG. 1, a large-scale decentralized network 100 is shown. In one example, large-scale decentralized network 100 may comprise a large number of distributed nodes 106 forming a large-scale decentralized network or system. In one example, each node of the large-scale decentralized network 100 may be communicatively coupled with at least one other node 106 of the large-scale decentralized network 100. In another example, each node of the large-scale decentralized network 100 may be communicatively coupled to a plurality of other nodes of large-scale decentralized network 100 or to each other node of the large-scale decentralized network 100. In one example, nodes 106 of the large-scale decentralized network may be communicatively coupled via a digital network, such as the Internet. The number of nodes 106 in the large-scale decentralized network 100 may be, for example, around 10,000. Nodes 106 within the large-scale decentralized network 100 may be grouped into node pools (herein also referred to as application shards), such as node pool 102. While a large number of nodes 106 and node pools 102 may be present in a large-scale decentralized network, for ease of illustration, a reduced number of nodes and node pools are shown in FIG. 1.

The node pool 102 represents a logical grouping of nodes 106 within the large-scale decentralized network 100. The groupings of nodes into node pools may be based on the needs of an application being run on the nodes of the node pool 102, such as a decentralized application (DAPP). DAPPs may perform functions similar to those of conventional applications, such as music streaming, computation, data storage, game hosting, transaction processing, identity validation, digital rights management etc. but with the benefit of being decentralized, transparent, immutable, and trustless. Node pools, such as node pool 102, may comprise nodes grouped together to perform a function, perform a calculation, render a service, implement a smart contract, or perform other actions. The number of nodes within a node pool and the configuration of nodes within a node pool may be based on the service or function for which the node pool is configured. In one example, a node pool such as node pool 102 may comprise a group of nodes executing/implementing a smart contract, wherein the smart contract may comprise instructions shared across the nodes of the node pool, which enable the nodes to execute complex behaviors/methods in concert. Node pool 102 may remain in communication with nodes 106 of the large-scale decentralized network 100, thereby enabling information to flow between the nodes of node pool 102 and the nodes 106 of the large-scale decentralized network 100. This may enable data originating outside of node pool 102 to be transferred to, and stored in, node pool 102, or conversely, to enable data generated by node pool 102 to flow to other nodes 106 of the large-scale decentralized network 100. Nodes 106 from the large-scale decentralized network may be added to node pool 102, and conversely, nodes may be removed from node pool 102. In one example, nodes 106 may be added to node pool 102 based on a total number of computations/transactions being processed by node pool 102, thereby enabling a speed of computation within node pool 102 to be maintained with pre-determined thresholds.

In the example shown in FIG. 1, node pool 102 comprises a plurality of nodes executing a random sequence generating mechanism/smart contract 104. In one example, the random sequence generating mechanism may comprise instructions stored in non-transitory memory of one or more nodes comprising node pool 102, that when executed perform one or more of the steps described below with reference to methods 200 and 300. In one example, node pool 102 may comprise additional functionality, such as implementing a game, wherein generated random sequences are used as the basis of decision making within the game (such as in determining a lottery winner). In another example, random sequences generated by node pool 102 may be transferred to other application shards/node pools for use therein. The nodes within node pool 102 may be communicatively coupled to each other, such that information may rapidly flow between the nodes within node pool 102. In one example, a block generated by a node of node pool 102 may be broadcast to the other nodes of the node pool 102, and thereby a blockchain may be maintained by node pool 102. Blocks generated by node pool 102 may comprise random sequences, generated according to methods such as those described below with reference to FIGS. 2 and 3. In the example shown in FIG. 1, currently selected node 108 represents a currently selected node, wherein the selection is based on a block generation order stored within random sequence generating mechanism 104. In one example, a block generation order comprises a pre-determined round-robin order of block generation, wherein each node of node pool 102 is selected to produce a single block once per cycle, and a cycle is complete once each node within node pool 102 has been selected to produce a block exactly once during the current cycle. In one example, if a node of node pool 102 is unable to produce a block, the next node in the block generation order is selected, and the process continues. Each generated block may be distributed to the nodes within node pool 102 according to a consensus protocol.

As will be discussed in more detail below, currently selected node 108 may receive data/signature shares (sig. shares) from one or more previously selected nodes. In the example shown in FIG. 1, currently selected node 108 receives a sig. share from previously selected node 110.

Currently selected node 108 may determine a threshold sig. based on the one or more received sig. shares from previously selected node 110. In one example, currently selected node 108 uses polynomial interpolation on a first sig. share received from previously selected node 110 and a second sig. share (its own sig. share) to determine a threshold sig. In another example, the threshold sig. may be used directly as the random sequence. In yet another example, the threshold sig. may be used to generate a random sequence, such as by seeding a pseudo-random-number-generator (PRNG). Currently selected node 108 may broadcast its own sig. share to one or more nodes which are to be selected next according to the block generation order, thereby enabling subsequently selected nodes to produce random sequences. In the example shown in FIG. 1, currently selected node 108 broadcasts its sig. share to next selected node 112, wherein next selected node 112 comprises the immediate next node of node pool 102 to be selected to generate a block and/or random sequence according to random sequence generating mechanism 104.

Figure 2:
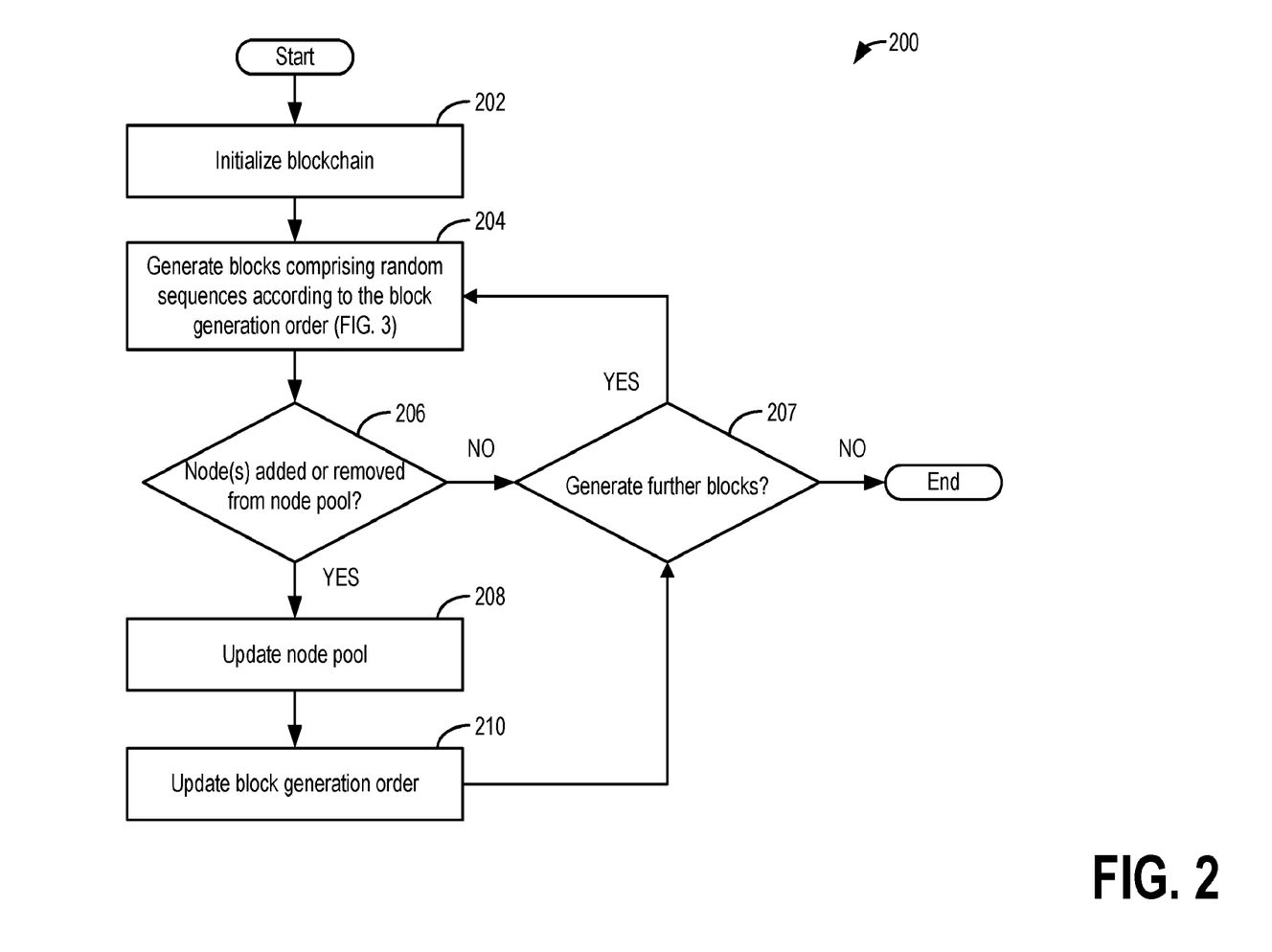
FIG. 2 shows a high level flowchart for initializing and maintaining a blockchain according to embodiments of the current disclosure.

Turning to FIG. 2, an example method 200 for initializing and maintaining a blockchain comprising random sequences is shown. Method 200 may be implemented by a node pool, such as node pool 102 of large-scale decentralized network 100. Method 200 may be stored in memory of one or more nodes within a node pool, and in some examples, method 200 may comprise instructions stored as a smart contract. Method 200 comprises initializing a random sequence generating blockchain by producing at least m−1 blocks without random sequences, as sufficient propagation of sig. shares within the node pool has not yet occurred. Following generation of the first m−1 blocks, each subsequent block may comprise a random sequence, wherein the random sequence is determined based on m sig. shares of the node pool, such that no single party may unanimously influence the random sequence. Method 200 may further include updating a block generation order based on nodes joining or leaving the node pool. In this way, a node pool maintaining a random sequence generating blockchain may be initialized and maintained, even as the member nodes of the node pool change.

Method 200 begins at 202, which may include initializing the random sequence generating blockchain. In one example, initializing the random sequence generating blockchain may comprise selecting/determining an initial integer number of nodes, n, to implement the blockchain, wherein the n selected nodes may also be referred to as the node pool. The number of nodes selected may be determined based on a target rate of random sequence generation, wherein a greater target rate of random sequence generation may correspond with a greater n. Upon selection of the n nodes comprising the node pool, a block generation order may be determined, which comprises an ordered list indicating an order of block generation for each node within the node pool. In other words, the block generation order comprises an order in which each node of the node pool may be selected to generate a block of the random sequence generating blockchain. Once nodes 1 through node n of the node pool have each been selected once to produce a block and/or random sequence, the block generation order may repeat, and in this manner block generation within a node pool may occur in a predictable and pre-determined manner, such that each node within the node pool is selected to produce a block once per cycle according to a round-robin scheduling scheme, and thereby each node is given an equal probability to produce a block. Each node of the node pool may have access to the block generation order, and as such, each member node of the node pool may have a record of previously selected nodes, the current selected node, and the nodes which are to be selected next. Initializing the random sequence generating blockchain further comprises producing the first m−1 blocks of the blockchain without random sequences, as for the first m−1 blocks, each node selected to produce a block may have less than m sig. shares, and may therefore be unable to determine a threshold sig. and random sequence. As used in the current disclosure, m is a positive integer greater than 1 and equal or less than n (the number of nodes of the node pool). Further, initializing a random sequence generating blockchain may comprise distributing n secret shares, to the initial n nodes of the node pool, wherein possession of a secret share enables a node to generate sig. shares. In one example, nodes within a node pool may prove valid membership to the node pool by signing messages using their secret share to produce a sig. share. Method 200 may then proceed to 204.

At 204, method 200 may include generating blocks comprising random sequences according to the block generation order (as will be discussed in more detail below with reference to FIG. 3). Briefly, each currently selected node may determine if it has access to a threshold number of sig. shares (m), and responsive to a determination that the currently selected node has access to m or more sig. shares (m−1 of these sig. shares being from previously selected nodes), the currently selected node may determine a threshold sig., which, in one example, may be used as the random sequence, and in another example, may be used to generate a random sequence by seeding a PRNG. Method 200 may then proceed to 206.

At 206, method 200 may include evaluating if node(s) have been added or removed from the node pool. If at 206 it is determined that no new nodes have been added to the node pool and no nodes removed from the node pool, method 200 may proceed to 207. However, if at 206 it is determined that one or more nodes have been added and/or removed from the node pool, method 200 may proceed to 208.

At 207, method 200 may include determining if further blocks are to be generated. If at 207 it is determined that further blocks are to be generated, method 200 may return to 204, whereat block and random sequence generation may proceed based on the previously determined block generation order. However, if at 207 it is determined that no further blocks are to be generated, method 200 may then end.

At 208, method 200 may include updating the node pool based on the newly added/removed node(s). As an example, a newly added node may need to receive a current version of the random sequence generating mechanism/smart contract from one or more other nodes of the node pool before the newly added node may begin generating blocks and random sequences. In another example, a newly added node may receive an identification number, uniquely identifying the newly added node as a member node of the node pool, and for use by other nodes of the node pool. In another example, a newly added node may need to receive a secret share prior to producing sig. shares, and as such, step 208 may comprise one or more member nodes of the node pool transmitting a secret share to the newly added node(s). As another example, at 208, a secret share and/or a member node ID may be removed from a node which is exiting the node pool. In this way, nodes may enter or leave the node pool without disrupting generation of random sequences. Method 200 may then proceed to 210.

At 210, method 200 may include updating the block generation order to account for the newly added node(s)

and/or removed node(s). In one example, step 210 may comprise adding IDs of new member nodes to the block generation order. In another example, step 210 may comprise removing IDs of removed member nodes from the block generation order. As an example, upon adding or removing a node from the block generation order, the block generation order may be reshuffled, wherein the order of block production by each node is randomly re-determined. In another example, newly added nodes may be inserted into the pre-existing order, while removed nodes may be removed from the pre-existing order, without reshuffling the entire block generation order. As a more specific example, if a current block generation order comprises {node1, node2, node3}, addition of a new node (node4) may result in a block generation order of {node1, node2, node3, node4}, and subsequent removal of node2 may result in a block generation order of {node1, node3, node4}. Once the block generation order has been updated to account for changes the node pool, method 200 may proceed to 207 to determine if further blocks are to be generated (as described hereinabove).

In this way, a random sequence generating blockchain may be initialized, maintained, and updated, thereby providing a source of on-chain random sequences, which may be used internally within the node pool, or may be accessed by other node pools/application shards.

Figure 3:
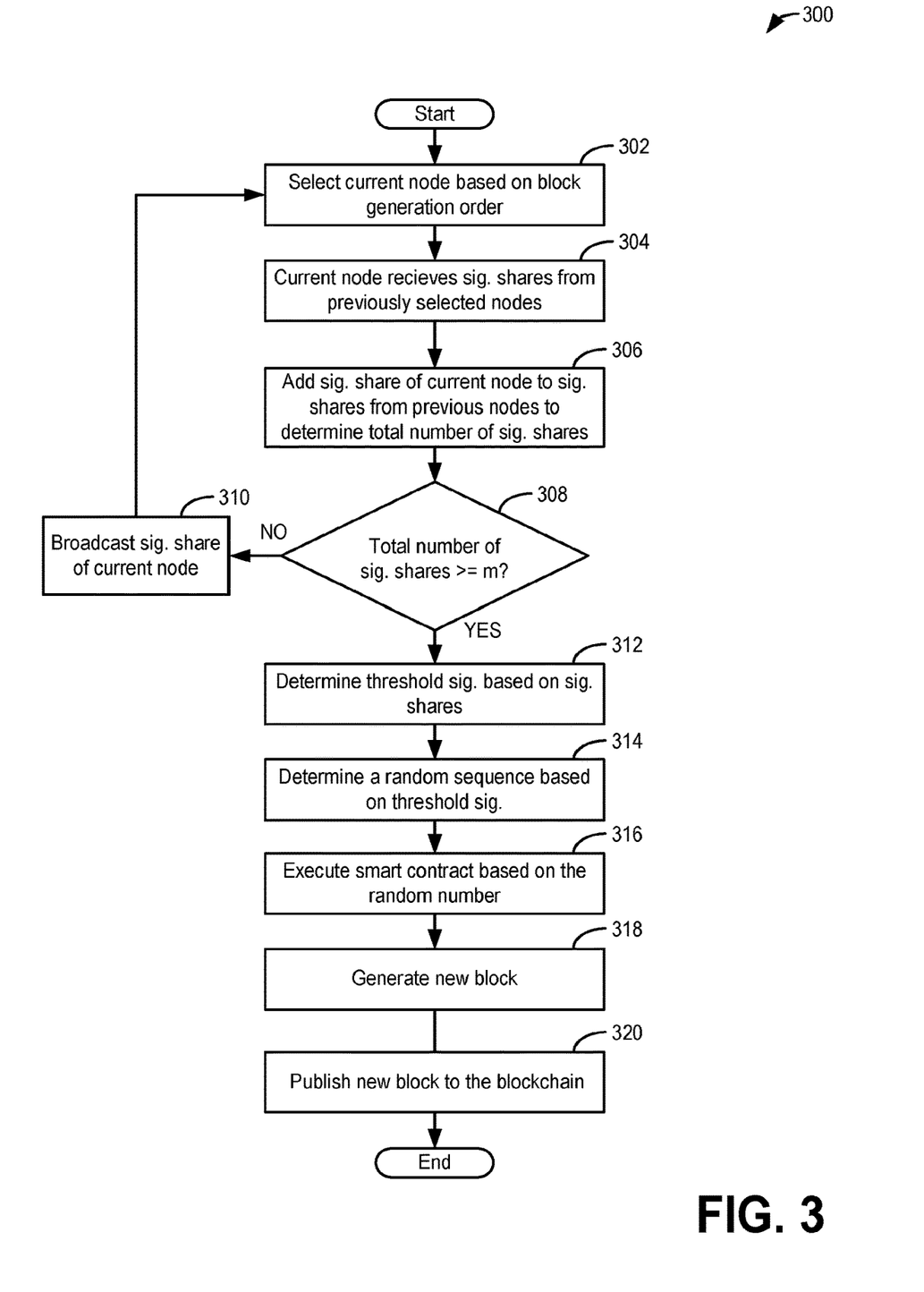
FIG. 3 shows a high level flowchart of a method for generating random sequences on a blockchain according to embodiments of the current disclosure.

Turning now to FIG. 3, an example method for generating on-chain random sequences in a decentralized and computationally efficient manner is shown. Method 300 may be executed by one or more nodes within a node pool, based on instructions stored in the one or more nodes, and or accessed by the one or more nodes via a network connection. In one example, method 300 may comprise a random sequence generating mechanism stored on-chain, which may, in one example, be configured as a smart contract. Method 300 comprises selecting a current node to produce a current block of the blockchain, the currently selected node receiving one or more sig. shares from one or more previously selected nodes, and responsive to the currently selected node receiving m−1 or more sig. shares (as used herein, m−1 sig. shares may also be referred to as a threshold number of sig. shares) generating a random sequence and publishing the random sequence to the blockchain. Method 300 may enable multiple parties to generate a random sequence in a transparent manner, wherein no single party may determine/influence the random sequence produced, with linear message complexity.

Method 300 begins at 302, which may include selecting a current node based on the block generation order. In one example, a block generation order comprises a pre-determined ordered list of n node IDs uniquely corresponding to each of the n member nodes within a node pool, wherein the ordered list is iterated through once during a cycle, and each node corresponding to each node ID within the ordered list is selected to produce one block per cycle, such that n blocks may be produced during one iteration through the block generation order. Each member node of the node pool may maintain a record of the previously selected nodes, the current selected node, as well as the block generation order. In an example, a block generation order module of one or more member nodes, such as block generation order module 510, may maintain a record of the previously selected nodes, the current selected node, as well as the block generation order. After the current node is selected, method 300 may proceed to 304.

At 304, method 300 includes the currently selected node receiving sig. shares from one or more previously selected nodes, wherein the term previously selected nodes refers to nodes which were selected according to the block generation order previously to produce a block. In one example, a sig. share may be transmitted directly from a previously selected node to a current node, in a message or data packet. In another example, blocks generated by each member node may comprise the sig. share of the node, and thereby previously selected nodes may transmit sig. shares via incorporation of their sig. shares into the blocks produced by the node, which are then broadcast to the other member nodes. Method 300 may then proceed to 306.

At 306, method 300 includes adding a sig. share of the current node to sig. shares from previously selected nodes to determine a total number of sig. shares available to the current node. Once the total number of sig. shares available to the current node is determined, method 300 may proceed to 308.

At 308, method 300 may include evaluating if the total number of sig. shares available to the current node is greater than or equal to m. Recalling that m is a positive integer, greater than 1, and less than or equal to the total number of nodes within the node pool (n), in many cases m may be set to one of a range of values. As a specific example, if a node pool comprises 1,000 nodes, m may be set to any value in the range of 2 to 1,000, such as 2, 999, 37, 1,000, and so on. Selection of m may be based on considerations of security, and computational speed. For example, a larger value of m may require additional time and computational resources to produce a random sequence, as a larger number of sig. shares may need to be generated and transmitted before a random sequence may be generated. However, a large value of m implies greater security and reduces the probability that any single party may influence a random sequence, or know the random sequence before it is generated. As a specific example, m may be set to 2 based upon an implementation context which favors speed, whereas m may be set to n (or closer to n) as the implementation context favors security and/or has little or no constraints regarding speed of random sequence generation. As another example, m may be set as a fraction of n, such as 50% of n, so long as the fraction is rounded to a nearest integer. Upon a determination that the total number of sig. shares available to the current node is less than m, method 300 may proceed to 310. At 310, method 300 includes broadcasting the sig. share of the current node to other nodes of the node pool, before returning to 302, where the next node in the block generation order is selected, and method 300 continues.

However, if at 308 it is determined that the total number of sig. shares is equal to or greater than m, method 300 may proceed to 312.

At 312, method 300 may include determining a threshold sig. based on sig. shares. In one example, a threshold sig. may be determined using polynomial interpolation on the m sig. shares. Determining a threshold sig. from m or more sig. shares may be conducted by a random sequence generating module (such as random sequence generating module 512) of one or more member nodes of the node pool. As an example, a threshold sig. comprises a unique signature which may only be derived from m or more sig. shares. Once a threshold sig. is determined, method 300 may proceed to 314.

At 314, method 300 may include determining a random sequence based on the threshold sig. In one example, the threshold sig. determined in step 312 may be used to seed a PRNG, thereby producing a random sequence from the threshold sig. It will be appreciated that the threshold sig. may in some examples, comprise a random sequence, and therefore no need to seed a PRNG using the threshold sig. may exist. Once a random sequence is generated, method 300 may proceed to 316.

At 316, method 300 may include executing one or more smart contracts based on the random sequence. In one example, one or more smart contracts may take a dependence on a random sequence produced by the node pool (the one or more smart contracts may be implemented within the node pool generating the random sequences, or in a node pool or application shard external to the node pool generating the random sequences). As a specific example, a smart contract may comprise a mechanism for operating a lottery, wherein funds from a plurality of accounts are transferred to a single fund maintained by the smart contract, and at a pre-determined time, the cumulative funds within the smart contract may be allocated to a single account based on a random sequence generated according to method 300. In such examples, it may be advantageous that the random sequence is produced in such a way as to prevent any single party from influencing/determining the random sequence, which may influence/determine the outcome of the smart contract/lottery/game, etc. Details of the execution of the smart contract based on the random sequence may be recorded by the current node and incorporated into a block added to the blockchain, thereby providing a verifiable record of any on-chain transactions which occur due to execution of a smart contract based the random sequence. Method 300 may then proceed to 318.

At 318, method 300 may include generating a new block. In one example, blocks generated by the member nodes of the node pool may comprise the random sequence and/or the threshold sig., the sig. shares used to determine the threshold sig., and the transaction details of any transactions executed based on the random sequence and/or threshold sig. As an example, the lottery example given above may comprise one or more transaction details which may be incorporated into a block, along with the random sequence, the threshold sig. and the sig. shares used to determine the threshold sig. In this way, other nodes of the node pool may evaluate the validity of the generated random sequence by determining if the random sequence produced corresponds to the sig. shares. Thus consensus may be reached regarding the validity of any random sequences generated, as well as any transactions or other smart contract execution which occurs based on the generated random sequence. Once the new block is generated, method 300 may proceed to 320.

At 320, method 300 may include publishing the new block to the blockchain. In one example, publishing the new block to the blockchain comprises transmitting the new block to each other node of the node pool. In another example, publishing the new block to the blockchain comprises transmitting the new block to a portion of the other nodes of the node pool, which may be subsequently followed by additional propagation of the new block by the other nodes of the node pool, until consensus is achieved. After the new block has been published to the blockchain, method 300 may end.

Turning now to FIG. 4, flow diagram 400 of a process for generating random sequences on a blockchain is shown. Flow diagram 400 illustrates the communication/data transfer between the member nodes of a node pool which may occur as part of executing a method for generating a random sequence in a large-scale decentralized network maintaining one or more blockchains (such as method 300). Flow diagram 400 comprises node 1 402, node 2 404, node m 406, and node m+1 408. Node 1 402, node 2 404, node m 406, and node m+1 408 are arranged with nodes earlier in a block generation order being positioned to the left of nodes later in the block generation order. As an example, node 1 402 may be selected to produce a block before node 2 404 based on a block generation order. Flow diagram 400 includes an ellipsis between node 2 404 and node m 406, indicating that any number of intervening nodes may occur between node 2 404 and node m 406. Likewise, the ellipsis to the right of node m+1 indicates that any number of nodes may follow node m+1, or in other words, that the node pool may comprise any number (n) of nodes. Node 1 402 comprises the first node in the block generation order, while node n (not shown) comprises the last node in the block generation order. Once each node in the block generation order has produced a block, the process starts over at the first node.

Starting at 412, flow diagram 400 includes node 1 402 generating the first block (block 101) of the random sequence generating blockchain. The first block of a blockchain is also referred to as a genesis block. As node 1 402 has access at 412 only to its own sig. share of a sig. on each of m pre-determined messages, the first generated block may not comprise a threshold sig. or random sequence, as m or more sig. shares are required to produce a threshold sig. for a given message.

Next, at 414, flow diagram 400 includes node 1 402 broadcasting block 101 to each other member node of the node pool, this may also be referred to as publishing a block to the blockchain.

At 416, flow diagram 400 includes node 1 402 broadcasting m sig. shares to each other member node of the node pool. Short-dashed box 417 provides an example of the m sig. shares with reference to node 1 402. Since each of the m sig. shares may be a sig. on one of m pre-determined messages (e.g., block numbers), a sig. share 1 may be given as "sig(101) by node 1," or "sig$_{n1}$(101)," wherein "101" is the block number at which a threshold sig. may be constructed from sig. shares corresponding to block 101. Similarly, "sig(102) by node 1," . . . , "sig(100+m) by node 1" (e.g., a remaining set of m−1 sig. shares, from a sig. share 2 to a sig. share m) may be broadcast, corresponding to m−1 further blocks.

Then, at 418, the next node in the block generation order, node 2 404, is selected to produce the next block in the random sequence generating blockchain (block 102). Node 2 404 has received "sig(102) by node 1" from node 1 402, and also has access to its own sig. share ("sig(102) by node 2") for block 102, thus the total number of sig. shares to which node 2 404 has access is 2, which is less than m, and therefore node 2 cannot produce a threshold sig. and/or random sequence for block 102.

Thus, similar to 414, at 420 node 2 404 produces block 102 without a threshold sig. or random sequence, and block 102 is broadcast to each other member node of the node pool.

Although in the example shown by flow diagram 400, m is implied as being greater than 2, it will be appreciated that m may be selected as 2, in which case node 2 404 would be enabled to produce a threshold sig. and/or random sequence.

At 422, flow diagram 400 includes node 2 404 broadcasting m sig. shares to each other member node of the node pool. Similar to that described hereinabove at 416, the m sig. shares may correspond to block 102 and to m−1 further blocks. Thus, the first m−1 nodes of the block generation order produce blocks without random sequences, and broadcast their respective sig. shares to each other member node of the node pool.

Then, at 424, node m 406 is selected. As depicted in long-dashed box 423, node m 406 has access to at least "sig(100+m) by node 1," "sig(100+m) by node 2," ..., "sig(100+m) by node m−1," and further, node m 406 has access to its own m sig. shares, including "sig(100+m) by node m." In other words, node m 406 (which represents the $m^{th}$ node in the block generation order) has access to a total number of m sig. shares corresponding to block 100+m, and is therefore enabled to construct a first threshold. sig. (threshold sig. 1) by performing polynomial interpolation on the m sig. shares corresponding to block 100+m. In one example, the threshold sig. derived in this manner may be used as the random sequence. In another example, the threshold sig. derived in this manner may be used to seed a PRNG to produce a random sequence. Thus, at 424, flow diagram 400 includes node m 406 generating a first random sequence (random sequence 1), and subsequently at 426, generating block 100+m, which includes random sequence 1. Any smart contracts and/or transactions executed responsive to random sequence 1 may likewise be included within block 100+m. Block 100+m may further comprise "sig (100+m) by node 1" through "sig(100+m) by node m." Then, at 428, node m 406 broadcasts block 100+m to each other member node of the node pool. In one example, one or more other member nodes of the node pool may perform validation of the random sequence by re-deriving the random sequence using the sig. shares included within block m. Finally, at 430, node m 406 broadcasts m sig. shares to each other member node of the node pool. Similar to that described hereinabove at 416, the m sig. shares may correspond to block 100+m and to m−1 further blocks.

In the case that there are less than m−1 nodes following a node within the block generation order, flow diagram 400 may wrap back to the beginning of the block generation order. That is, if a node n+1 is to generate a block 100+(n+1), as the block generation order includes nodes up to n (but does not include nodes greater than n), flow diagram 400 may proceed to node n+1−n (or more simply, node 1). As a more specific example, in a scenario in which n=10 and m=2, if node 10 has broadcasted 2 sig. shares corresponding to a block 110 (generated by block 10) and a block 111 (to be generated by a block 11), flow diagram 400 may proceed to node 1, as no node 11 may occur within a node pool of size n=10.

At 432, node m+1 408 is selected. Node m+1 408 has access to at least "sig(100+m+1) by node 2," "sig(100+m+1) by node 3," ..., "sig(100+m+1) by node m," and further, node m+1 408 has access to its own m sig. shares, including "sig(100+m+1) by node m+1." In other words, node m+1 408 (which represents the $m+1^{th}$ node in the block generation order) has access to a total number of m sig. shares corresponding to block 100+(m+1), and is therefore enabled to produce a second threshold. sig. (threshold sig. 2) by performing polynomial interpolation on the m sig. shares corresponding to block 100+(m+1). In one example, the threshold sig. derived in this manner may be used as the random sequence. In another example, the threshold sig. derived in this manner may be used to seed a PRNG to produce a random sequence. Thus, at 432, flow diagram 400 includes node m+1 408 generating a second random sequence (random sequence 2), and subsequently at 434, generating block 100+(m+1), which includes random sequence 2. Smart contracts and/or transactions executed responsive to random sequence 2 may likewise be included within block 100+(m+1). Block 100+(m+1) may further comprise "sig(100+m+1) by node 2" through "sig(100+m+ 1) by node m+1." Then, at 436, node m+1 408 broadcasts block 100+(m+1) to each other member node of the node pool. In one example, one or more other member nodes of the node pool may perform validation of the random sequence by re-deriving the random sequence using the sig. shares included within block 100+(m+1). Finally, at 438, node m+1 408 broadcasts m sig. shares to each other member node of the node pool. Similar to that described hereinabove at 416, the m sig. shares may correspond to block 100+(m+1) and to m−1 further blocks.

Thus, each block after the initial m−1 blocks may contain a random sequence produced in a decentralized and transparent manner. This process may be continued for each node within the node pool, until node n (the final node according to the block generation order) is reached. After node n is reached, the process continues from node 1 (that is, the block generation order wraps back to the first node), however unlike in the case at 412, node 1 may now have access to sig. shares from at least m−1 previously selected nodes (such as node n, node n−1, ..., node n−(m−1)), and in this manner, random sequence generation may proceed uninterrupted, even when the block generation order wraps back to the first node.

Thus, at 440, node 1 402 is selected a second time. Node 1 402 has access to at least "sig(100+n+1) by node n−(m−2)," "sig(100+n+1) by node n−(m−1)," "sig(100+n+1) by node n," and further, node 1 402 has access to its own m sig. shares, including "sig(100+n+1) by node n+1." In other words, node 1 402 (which at 440 represents the $n+1^{th}$ node in the block generation order) has access to a total number of m sig. shares corresponding to block 100+(n+1), and is therefore enabled to produce an $n-(m-2)^{th}$ threshold. sig. [threshold sig. n−(m−2)] by performing polynomial interpolation on the m sig. shares corresponding to block 100+(n+1). Thus, at 440, flow diagram 400 includes node 1 402 generating an $n-(m-2)^{th}$ random sequence [random sequence n−(m−2)], and subsequently at 442, generating block 100+(n+1), which includes random sequence n−(m− 2). Smart contracts and/or transactions executed responsive to random sequence n−(m−2) may likewise be included within block 100+(n+1). Block 100+(n+1) may further comprise "sig(100+n+1) by node n−(m−2)" through "sig(100+ n+1) by node n+1." Then, at 444, node 1 402 broadcasts block 100+(n+1) to each other member node of the node pool. In one example, one or more other member nodes of the node pool may perform validation of the random sequence using the sig. shares included within block 100+ (n+1). Finally, at 446, node 1 402 broadcasts m sig. shares to each other member node of the node pool. Similar to that described hereinabove at 416, the m sig. shares may correspond to block 100+(n+1) and to m−1 further blocks.

In this way, a node pool may generate random sequences on-chain using a linear messaging complexity, wherein no party may determine the random sequence without cooperating with m−1 other parties. In other words, the current disclosure provides for deriving random sequences in a multi-party fashion, wherein the messaging complexity increases linearly as a function of m (the number of cooperating parties required to generate a random sequence). That is, as the number of sig. shares/cooperating parties required to produce a random sequence increases, the messaging complexity increases proportionally (as opposed to exponentially). The technical effect of providing a method for on-chain generation of random sequences with linear messaging complexity is that random sequences may be generated in a decentralized, transparent, trustless, and immutable fashion, while reducing an amount of time and/or computational resources employed.

In examples not depicted at flow diagram 400, a node may be missing one or more sig. shares, for block generation (e.g., a currently selected block according to the block generation order may have less than m total sig. shares, and may therefore be unable to produce a threshold sig. and a random sequence). As such, a block may not be generated at the currently selected node, and the currently selected node may broadcast its own sig. share to the node pool before the next node in the block generation order is selected. By broadcasting its own sig. share to the node pool, the currently selected node may compensate for a missing sig. share, thereby enabling the next selected node to produce a threshold sig. and random sequence. In cases where multiple sig. shares are missing at a currently selected node, the above described process may continue until m sig. shares are accumulated at a currently selected node, that is, each selected node which is unable to produce a threshold sig. and random sequence may broadcast its own sig. share to the other member nodes of the node pool, until a next selected node has m or more sig. shares, and may therefore produce a threshold sig. and a random sequence. This may enable continued generation of random sequences even if one or more nodes fail to broadcast a sig. share for any reason.

Turning now to FIG. 5, a schematic block diagram of an apparatus 500 is shown. The apparatus 500 may correspond to one or more nodes of a node pool (such as node pool 102) operating within a large-scale decentralized network (such as large-scale decentralized network 100), configured to enable the method of generating random sequences on-chain, as described above with reference to FIGS. 2, 3, and 4.

The apparatus 500 may include one or more processors 502 configured to access and execute computer-executable instructions stored in at least one memory 504. The processor 502 may be implemented as appropriate in hardware, software, firmware, or combinations thereof. Software or firmware implementations of the processor 502 may include computer-executable or machine-executable instructions written in any suitable programming language to perform the various functions described herein. The processor 502 may include, without limitation, a central processing unit (CPU), a digital signal processor (DSP), a reduced instruction set computer (RISC) processor, a complex instruction set computer (CISC) processor, a microprocessor, a microcontroller, a field programmable gate array (FPGA), a System-on-a-Chip (SOC), or any combination thereof. The apparatus 500 may also include a chipset (not shown) for controlling communications between the processor 502 and one or more of the other components of the apparatus 500. The processor 502 may also include one or more application-specific integrated circuits (ASICs) or application-specific standard products (ASSPs) for handling specific data processing functions or tasks.

The memory 504 may include, but is not limited to, random access memory (RAM), flash RAM, magnetic media storage, optical media storage, and so forth. The memory 504 may include volatile memory configured to store information when supplied with power and/or non-volatile memory configured to store information even when not supplied with power. The memory 504 may store various program modules, application programs, and so forth that may include computer-executable instructions that upon execution by the processor 502 may cause various operations to be performed. The memory 504 may further store a variety of data manipulated and/or generated during execution of computer-executable instructions by the processor 502.

The apparatus 500 may further include one or more network interfaces 506 that may facilitate communication between the apparatus 500 and one or more other nodes using any suitable communications standard. For example, a LAN interface may implement protocols and/or algorithms that comply with various communication standards of the Institute of Electrical and Electronics Engineers (IEEE), such as IEEE 802.11, while a cellular network interface implement protocols and/or algorithms that comply with various communication standards of the Third Generation Partnership Project (3GPP) and 3GPP2, such as 3G and 4G (Long Term Evolution), and of the Next Generation Mobile Networks (NGMN) Alliance, such as 5G.

The memory 504 may store various program modules, application programs, and so forth that may include computer-executable instructions that upon execution by the processor 502 may cause various operations to be performed. For example, the memory 504 may include an operating system module (O/S) 508 that may be configured to manage hardware resources such as the network interface 506 and provide various services to applications executing on the apparatus 500.

The memory 504 may store additional program modules such as a block generation order module 510, and a random sequence generating module 512, each of which includes functions in the form of logic and rules that support and enable the method of generating random sequences within a node pool in a large-scale decentralized network, as described above with reference to FIGS. 2, 3, and 4. Each of the block generation order module 510 or random sequence generating module 512 includes computer-executable instructions that when executed by the processor 502 cause various operations to be performed, such as the operations described above with respect to FIGS. 2, 3 and 4. In one example, a current block generation order, which may comprise an ordered list of node IDs, and which may indicate the order in which nodes within a node pool are selected to generated blocks and random sequences, may be stored in block generation order module 510. In another example, block generation order module may comprise logic and/or rules for determining a new block generation order based upon a change to the node pool, such as removal and/or addition of one or more nodes from/into the node pool. In another example, random sequence generating module 512 may comprise logic rules for determining random sequences, validating previously determined random sequences, generating sig. shares, and broadcasting sig. shares to other nodes of the node pool. In one example, a block generation order module 510 and/or a random sequence generating module 512 of a first node may be called by a second node, and therefore information stored in one or more modules of memory 504 may be transferred to one or more additional nodes of a node pool.

The apparatus 500 and modules 510 and 512 disclosed herein may be implemented in hardware or software that is executed on a hardware platform. The hardware or hardware platform may be a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a smart card, a flash memory device (e.g., card, stick, key drive), random access memory (RAM), read only memory (ROM), programmable ROM (PROM), erasable PROM (EPROM), electrically erasable PROM (EEPROM), a general register, or any other suitable non-transitory medium for storing software.

The disclosure also provides support for a method comprising: selecting a first node based on a block generation order, where the first node is selected to generate a current block; adding a first signature share of the first node to the current block; adding at least a second signature share from a previously selected node to the current block; generating a random sequence based on the first signature share and the second signature share; adding the random sequence to the current block; and publishing the current block to a blockchain maintained by a node pool. In a first example of the method, wherein generating the random sequence based on the first signature share and the second signature share comprises determining a threshold signature from the first signature share and the second signature share, and determining the random sequence from the threshold signature. In a second example of the method, optionally including the first example, the method further comprising executing a transaction based on the random sequence. In a third example of the method, optionally including the first and second examples, wherein the current block comprises: the first signature share; the second signature share; a threshold signature, wherein the threshold signature is determined based on the first signature share and the second signature share; the random sequence, wherein the random sequence is determined based on the threshold signature; and a transaction. In a fourth example of the method, optionally including the first through third examples, the method further comprising broadcasting the first signature share of the first node to at least a next selected node within the node pool, wherein the next selected node is selected based on the block generation order. In a fifth example of the method, optionally including the first through fourth examples, wherein broadcasting the first signature share of the first node to at least the next selected node comprises adding the first signature share of the first node to the current block, and broadcasting the current block to the next selected node. In a sixth example of the method, optionally including the first through fifth examples, wherein the previously selected node was selected to generate a previous block based on the block generation order. In a seventh example of the method, optionally including the first through sixth examples, the method further comprising, responsive to addition of a new node to the node pool, updating the block generation order. In an eighth example of the method, optionally including the first through seventh examples, the method further comprising, responsive to removal of a node from the node pool, updating the block generation order.

The disclosure also provides support for a method of generating a random sequence in a node pool, the method comprising: selecting a first node of the node pool based on a block generation order; receiving a plurality of signature shares at the first node; responsive to the plurality of signature shares exceeding a threshold number of signature shares: determining a threshold signature; generating a random sequence based on the threshold signature; and broadcasting a block to the node pool, wherein the block comprises: the plurality of signature shares; the threshold signature; and the random sequence. In a first example of the method, wherein determining the threshold signature comprises performing polynomial interpolation on a signature share of the first node and the plurality of signature shares. In a second example of the method, optionally including the first example, wherein receiving the plurality of signature shares at the first node comprises receiving one or more signature shares from one or more previously selected nodes of the node pool, wherein each previously selected node comprises a unique signature share. In a third example of the method, optionally including the first and second examples, wherein generating the random sequence based on the threshold signature comprises seeding a random sequence generator with the threshold signature. In a fourth example of the method, optionally including the first through third examples, wherein the threshold signature cannot be determined from less than the threshold number of signature shares. In a fifth example of the method, optionally including the first through fourth examples, wherein each of the plurality of signature shares corresponds to a unique secret share. In a sixth example of the method, optionally including the first through fifth examples, the method further comprising, executing a smart contract based on the random sequence. In a seventh example of the method, optionally including the first through sixth examples, wherein the block generation order comprises a round-robin schedule.

The disclosure also provides support for a node within a node pool comprising: a network interface; a memory; and a processor communicatively coupled to the network interface and the memory, the processor configured to: receive a plurality of signature shares from the node pool via the network interface; responsive to the plurality of signature shares exceeding a threshold number of signature shares: determine a threshold signature; generate a random sequence based on the threshold signature; and broadcast a block to the node pool via the network interface, wherein the block comprises: the plurality of signature shares; the threshold signature; and the random sequence. In a first example of the system, wherein the memory comprises a block generation order module configured with a current block generation order indicating an order of block generation for each node within the node pool. In a second example of the system, optionally including the first example, wherein broadcast the block to the node pool via the network interface comprises transmitting the block to a next selected node, wherein the next selected node is selected based on the block generation order, and wherein the next selected node is selected to produce a next block of a blockchain.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. No claim element is to be construed under the provisions of 35 U.S.C. § 112, sixth paragraph, unless the element is expressly recited using the phrase "means for" or, in the case of a method claim, the element is recited using the phrase "step for."

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g., read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one Application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuits forming a communications device. (e.g., a modem, communications switch, or the like)

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the order illustrated, in other orders, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   selecting a first node based on a block generation order, where the first node is selected to generate a current block;
   adding a first signature share of the first node to the current block;
   adding at least a second signature share from a previously selected node to the current block;
   generating a random sequence based on the first signature share and the second signature share;
   adding the random sequence to the current block; and
   publishing the current block to a blockchain maintained by a node pool.

2. The method of claim 1, wherein generating the random sequence based on the first signature share and the second signature share comprises determining a threshold signature from the first signature share and the second signature share, and determining the random sequence from the threshold signature.

3. The method of claim 1, the method further comprising executing a transaction based on the random sequence.

4. The method of claim 1, wherein the current block comprises:
- the first signature share;
- the second signature share;
- a threshold signature, wherein the threshold signature is determined based on the first signature share and the second signature share;
- the random sequence, wherein the random sequence is determined based on the threshold signature; and
- a transaction.

5. The method of claim 1, the method further comprising broadcasting the first signature share of the first node to at least a next selected node within the node pool, wherein the next selected node is selected based on the block generation order.

6. The method of claim 5, wherein broadcasting the first signature share of the first node to at least the next selected node comprises adding the first signature share of the first node to the current block, and broadcasting the current block to the next selected node.

7. The method of claim 1, wherein the previously selected node was selected to generate a previous block based on the block generation order.

8. The method of claim 1, the method further comprising, responsive to addition of a new node to the node pool, updating the block generation order.

9. The method of claim 1, the method further comprising, responsive to removal of a node from the node pool, updating the block generation order.

10. A method of generating a random sequence in a node pool, the method comprising:
- selecting a first node of the node pool based on a block generation order;
- receiving a plurality of signature shares at the first node;
- responsive to the plurality of signature shares exceeding a threshold number of signature shares:
  - determining a threshold signature;
  - generating a random sequence based on the threshold signature; and
  - broadcasting a block to the node pool, wherein the block comprises:
    - the plurality of signature shares;
    - the threshold signature; and
    - the random sequence.

11. The method of claim 10, wherein determining the threshold signature comprises performing polynomial interpolation on a signature share of the first node and the plurality of signature shares.

12. The method of claim 10, wherein receiving the plurality of signature shares at the first node comprises receiving one or more signature shares from one or more previously selected nodes of the node pool, wherein each previously selected node comprises a unique signature share.

13. The method of claim 10, wherein generating the random sequence based on the threshold signature comprises seeding a random sequence generator with the threshold signature.

14. The method of claim 10, wherein the threshold signature cannot be determined from less than the threshold number of signature shares.

15. The method of claim 10, wherein each of the plurality of signature shares corresponds to a unique secret share.

16. The method of claim 10, the method further comprising, executing a smart contract based on the random sequence.

17. The method of claim 10, wherein the block generation order comprises a round-robin schedule.

18. A node within a node pool comprising:
- a network interface;
- a memory; and
- a processor communicatively coupled to the network interface and the memory, the processor configured to:
  - receive a plurality of signature shares from the node pool via the network interface;
  - responsive to the plurality of signature shares exceeding a threshold number of signature shares:
    - determine a threshold signature;
    - generate a random sequence based on the threshold signature; and
    - broadcast a block to the node pool via the network interface, wherein the block comprises:
      - the plurality of signature shares;
      - the threshold signature; and
      - the random sequence.

19. The node of claim 18, wherein the memory comprises a block generation order module configured with a current block generation order indicating an order of block generation for each node within the node pool.

20. The node of claim 18, wherein broadcast the block to the node pool via the network interface comprises transmitting the block to a next selected node, wherein the next selected node is selected based on the block generation order, and wherein the next selected node is selected to produce a next block of a blockchain.

* * * * *